(12) United States Patent
Blaisdel

(10) Patent No.: X4898
(45) Date of Patent: Oct. 10, 1827

(54) BALANCE (ON DEARBORN'S IMPROVEMT)

(76) Inventor: Samuel Blaisdel

Samuel Blaisdel (Copied from a Printed sheet)

The schedule referred to in these Letters Patent, and making a part of the same: containing a description in the words of the said Samuel Blaisdel himself, of his improvement on Dearborn's Patent Ware-house Balance, so called, for weighing all kinds of substances, whether gross and ponderous, or light and delicate, called "Blaisdel's Improved Avoirdupois Balance."

To all to whom these presents shall come, Samuel Blaisdel of Lancaster, in the County of Fairfield, in the State of Ohio, White Smith, sends Greeting. Be it known, That I, Samuel Blaisdel, have made constructed, invented and applied to use a new and useful improvement on Dearborn's Patent Ware-house Balance, so called, for weighing all kinds of substances, whether gross and ponderous, or of a light and delicate weight, called Blaisdel's improved avoirdupois Balance, for the use of Counters, Where houses, &c. &c.

The improvement consists in an extension of the left hand, or brachia of the Ware-house Balance, now in use, called "Dearbon's Balance." with an additional scale board or dish suspended to a point at a greater distance from the fulcrum. The description is as follows, to wit:

Let there be a Balance constructed on the principle of Dearborn's Balances.

First – Let the right hand arm or brachia be graduated to the distance of sixteen inches from the fulcrum or axis of motion to the right, commencing with the fulcrum or central axis of motion at the first point, each inch constituting one major subdivision, and each of these again subdivided into eight minor subdivisions, of halves, quarters and eighths.

Second – At the end of this arm or brachia, at a proper distance beyond the last graduated point, let there be constructed a point of suspension for the purpose of receiving a weight designed to neutralize the weight of the scale boards suspended to the other arm.

Third – To a point of suspension on the left hand arm or brachia, precisely at the distance of one inch; or, supposing the major subdivision on the right hand arm or brachia to be less or more than one inch which is indifferent, precisely at the distance of one sixteenth of the graduated length or end of the major subdivision on the graduated arm or brachia, let there be suspended a scale board or dish, to receive the articles intended to be weighed.

Fourth – The foregoing is admitted to be embraced in Dearborn's Balance, and is described for the purpose only of specifying distinctly the improvement, and exhibits it in its connexion with the original The Improvement is as follows: First The left hand arm or brachia from the point at which Dearborn's Balance ceases, is produced or extended to a distance suitably and properly calculated to construct another additional point of suspension, precisely at the distance of sixteen inches from the fulcrum, or central axis of motion; or supposing the major subdivision of the graduated arm or brachia to be less or more than one inch, and consequently the whole graduated length of the arm, less or more, which is not material, as above stated, precisely the distance of the whole graduated length of the right hand arm or brachia from the point aforesaid.

Second – To this last described point of suspension is attached an additional scale board dish, the weight of which, together with the scale board dish, suspended to the interior point of suspension, is neutralized, and the equilibrium of the beam, together with the scale and other appendages above described, is maintained and regulated by the weight suspended at the extreme end of the graduated arm or brachia.

Third – The points of suspension with respect to the mode of their construction, are the same with those of Dearborn's Balance, excepting the one at the end of the right hand arm or brachia, designed for the reception of the weight or poise by which the equilibrium of the Balance is regulated, which instead of a hole being perforated through the arm, and in which the weight is suspended, is improved by being constructed in the same manner with points of suspension on the left hand arm or brachia designed for the suspension of the scale board or dishes.

Fourth – The points of suspension, together with the fulcrum or central axis of motion, all the rest on a straight line - That is to say: First -
not the centre but the upper edge of the two small pivots, or axles in
the left hand arm or brachia, on which points of suspension are form-
ed by their opposite sides, converging to a point and forming an edge on
which the scales or dishes are suspended, and which (being the points on
which the forces directly act) properly constitute the points of suspension.
Second - The lower extremity of the notches or subdivisions on the right
hand arm or brachia, by which the points of suspension of the known
weights are indicated. Third - The lower edge of the central axis of motion
constructed in the same way, only its position inverted; and Fourth -
The upper edge of the point of suspension at the extreme end of the
right hand arm or brachia, constructed in the same manner with
those in the left hand arm or brachia, are all of them so arranged that
a line drawn from the two extreme points will touch all the intermediate points.
Fifth - In the construction of the left hand arm or brachia (although
there is no peculiar shape in itself constitutes an essential property)
it is necessary that by the construction of an arch between the
two points of suspension above described, or by any other method
by which the same object may be effected; such a portion of the
materials of which it is composed may be thrown above the line
on which the points of suspension, and the fulcrum or central
axis of motion rests, as shall be necessary to bring about such a
distribution of the weight in the whole beam, as to constitute the
fulcrum a perfect centre of gravity thereto, when stripped of its appendages.
Sixth - The foregoing specifications constitute the improvement. The
advantages it embraces are the facilities afforded for weighing with
accuracy light substances in the extreme scale board or dish, while
the interior serves for heavier ones. The interior with a pound poise
suspended at the first major subdivision on the right hand arm or brachia,
weighs a pound when the exterior weighs an ounce; or by the use of
an ounce weight or poise suspended at the same point, an ounce
may be weighed in the interior scale board, or a drachm in the exterior.

Thus in a very material manner running the avoirdupois table.
In testimony that the foregoing is a true specification of my
said Improvement, as above described, I have hereunto set my hand
and seal the Eleventh day of August, A. D. eighteen hundred and twenty seven
Witnesses Samuel Blaisdel.
[illegible] D. H. Colerick
George Sanderson Exd. [illegible] (1200 words)